April 9, 1940. C. W. NESSELL 2,196,170
TEMPERATURE CONTROL SYSTEM
Filed June 10, 1937
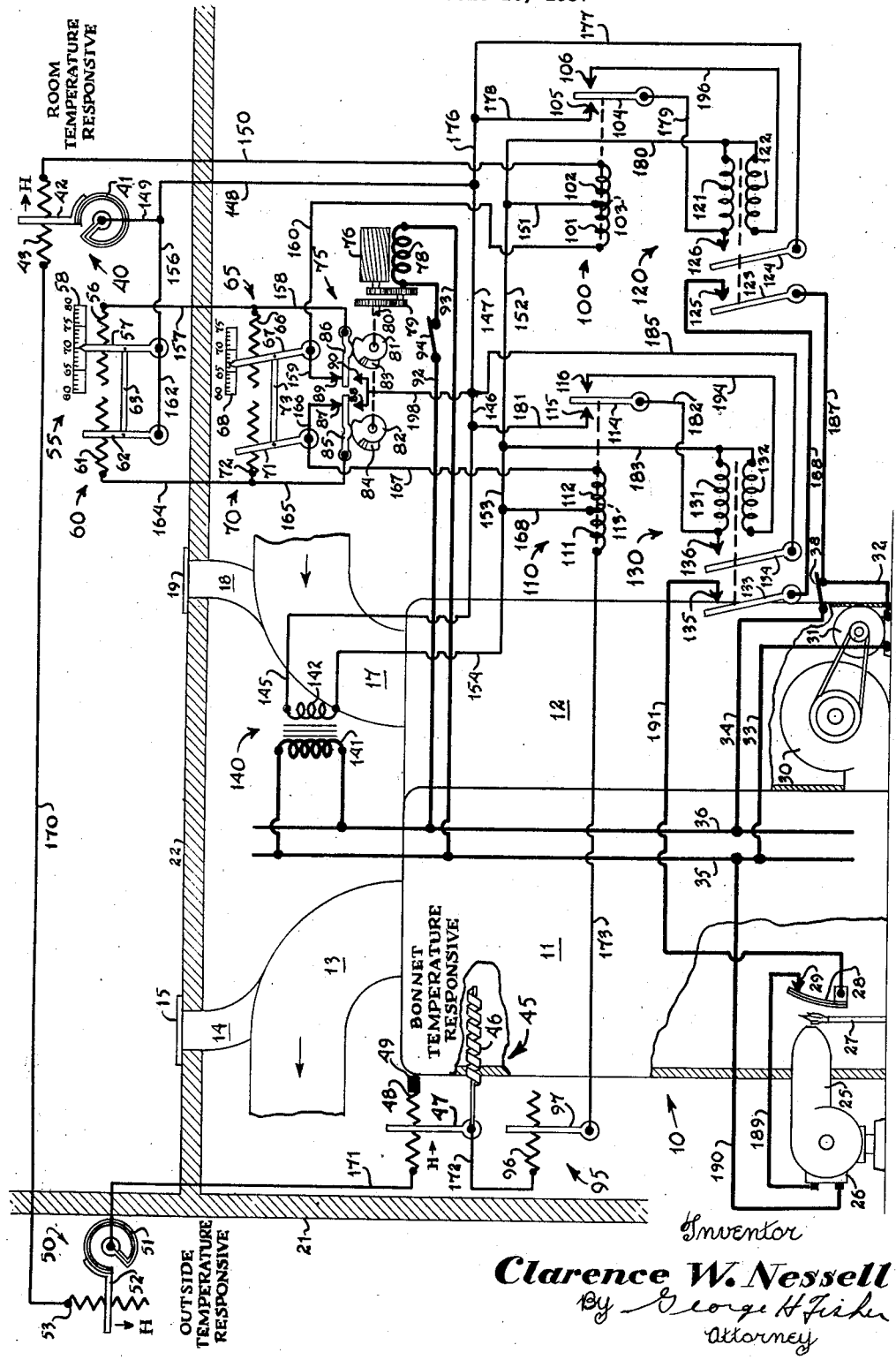
Inventor
Clarence W. Nessell
By George H Fisher
Attorney Patented Apr. 9, 1940

2,196,170

UNITED STATES PATENT OFFICE 2,196,170

TEMPERATURE CONTROL SYSTEM

Clarence W. Nessell, Dayton, Ohio, assignor to Minneapolis-Honeywell Regulator Company, Minneapolis, Minn., a corporation of Delaware Application June 10, 1937, Serial No. 147,472

11 Claims. (Cl. 236—11)

The present invention relates to a temperature control system and more particularly to one of the type employing a heating means having a heater and a fluid for conducting heat from the heater to a space to be heated.

In heating systems wherein a heater is employed to heat fluid which, in turn, conveys the heat from the heater to the space to be heated, it has been common practice to jointly control the heating system by means responsive to the temperature of the space and means responsive to the temperature of the fluid. The device responsive to the temperature of the space is usually referred to as a room thermostat whereas the device responsive to the temperature of the heated fluid is usually referred to as a limit control. This terminology is applicable regardless of whether the heated fluid is air, water or steam. While in the latter case, the device is usually directly responsive to the pressure of the steam, it is to be understood that the device is indirectly responsive to the temperature thereof and that in the following discussion and in the claims the expression "means responsive to the temperature of the fluid" is intended to be broad enough to include a device directly responsive to steam pressure. The difficulty with prior systems of this general type is that the temperature setting of the limit control has usually been more or less fixed. In the majority of cases, no provision is made for automatically varying the adjustment of the limit control as the heat demand varies. Where an attempt has been made to so vary the adjustment of the limit control, the adjustment has been made solely in response to outdoor temperature and has not taken into account the various other factors affecting the heat demand. Thus when it is desired to maintain a higher room temperature, the demand for heat is automatically increased. Similarly, there is often some abnormal condition such as an open window which increases the demand for heat.

An object of the present invention is to provide a temperature control system employing a heating means having a heater and a fluid for transferring heat from the heater to a space to be heated in which the heating means is controlled by both means responsive to the space temperature and means responsive to the fluid temperature and in which means are provided for always maintaining a relation between the control points of the temperature responsive means such that the temperature of the fluid is maintained by the fluid temperature responsive means at a value just sufficient to keep the space temperature at the value for which the space temperature means is set, regardless of the temperature setting of the space temperature responsive means and regardless of the heat demand.

A further object of the present invention is to provide a temperature control system employing a heating means having a heater and a fluid for transferring heat from the heater to a space to be heated in which the heating means is controlled by both means responsive to space temperature and means responsive to the fluid temperature and in which means is provided for simultaneously adjusting the control points of both temperature responsive means.

A further object of the present invention is to provide a simplified form of electrical control system for controlling a temperature changing device according to a plurality of conditions in such a manner as to maintain a definite correlation between the control of said device by certain of said conditions and by certain other of said conditions.

A further object of the present invention is to provide a system in accordance with the previous objects in which provision is made for automatically maintaining a lower space temperature during certain predetermined periods of the day.

Other objects of the present invention will be apparent from a consideration of the accompanying specification, claims and drawing.

In the single figure of the drawing, the temperature control system of the present invention is shown in schematic form.

Referring to the drawing for a more detailed description of the present invention, a furnace is generally designated by the reference numeral 10. This furnace comprises a warm air compartment 11 in which is housed the furnace proper and a return air compartment 12. Leading from the warm air compartment 11 is a warm air duct 13 which is provided with branch ducts 14 leading to registers 15 located in the space to be heated. Extending into return air compartment 12 of the furnace 10 is a return air duct 17. This duct has communicating therewith a branch return duct 18 which communicates with return air register 19 in the space to be heated. The heating plant is shown located in a building, the outside wall of which is designated by the reference numeral 21. The floor separating the compartment in which the heating plant is located from the space to be heated is indicated by the reference numeral 22.

An oil burner is employed as a heating unit for the furnace. This oil burner is designated by the reference numeral 25 and is operated by a motor 26, only the terminal plate of which is shown. Associated with the oil burner is a pilot burner 27 which is normally constantly burning and which serves to ignite the vaporized oil as it issues from the oil burner nozzle. Located adjacent to the pilot burner is a bimetallic element 28 which is adapted to cooperate with a contact 29. The bimetallic element is exposed to the pilot burner flame and is adapted when heated thereby to be flexed sufficiently to be in engagement with contact 29. The bimetallic element 28 and contact 29 constitute a safety pilot thermostat which is connected in series with the oil burner and prevents operation thereof when the pilot burner is not ignited.

Located in the return air compartment 12 is a fan 30. This fan serves to force the air entering the return duct through the warm air compartment to the individual rooms where it is returned through the individual return air ducts 18 and the main return air duct 17 back to the return air compartment 12. The fan 30 is operated by an electric motor 31. For purposes of simplification, the fan 30 is shown as being continuously operated. The motor is connected directly through conductors 32, 33, and 34 to line wires 35 and 36 leading to any suitable source of power (not shown). Interposed in conductor 34 is a manually operable switch 38 which may be open whenever it is desired to terminate operation of the fan. It is to be understood that the fan is operated whenever the heating plant is to be in operation. Since the switch 38 is also in the oil burner circuit, as will be more apparent from the subsequent description, it is impossible to operate the oil burner unless the fan is also in operation.

Located in the space to be heated is a room thermostat generally designated by the reference numeral 40. This thermostat comprises a bimetallic element 41 and a contact arm 42 which is adapted to slidably engage a resistance 43. As the space temperature rises, the bimetallic element is effective to move contact arm 42 to the right as indicated by the arrow. In this and in all the other cases of the various temperature responsive devices shown in the drawing, the arrow adjacent the contact arm indicates the direction which the arm is moved upon a temperature rise.

A bonnet thermostat is generally designated by the reference numeral 45. This thermostat comprises a bimetallic element 46 extending into the space above the furnace proper, commonly referred to as the "bonnet" of the furnace. Operatively connected to bimetallic element 46 is a contact arm 47 which is adapted to slidably engage a resistance 48. Adjacent one end of the resistance 48, a member 49 of insulating material is connected. As soon as contact arm 47 engages this member 49, the circuit is opened. This insulating member is located so as to be engaged by contact arm 47 at the maximum desired bonnet temperature.

A thermostat responsive to outdoor temperature is designated by the reference numeral 50. This thermostat comprises a bimetallic element 51 to which is secured a contact arm 52. The contact arm 52 slidably engages a resistance 53.

Preferably located in proximity to the room thermostat 40 is a rheostat 55. Rheostat 55 comprises a resistance 56 and a movable contact arm 57 which slidably engages the resistance 56. The contact arm 57 cooperates with a scale 58 which may be calibrated to indicate various temperatures. Rheostat 57, as will be more apparent from the subsequent description, is used to vary the temperature which the room thermostat 40 tends to maintain. In other words, the rheostat 55 is used to vary the control point of thermostat 40. The scale 58 serves to indicate the control point of the room thermostat 40.

Associated with the rheostat 55 is a second rheostat 60. This rheostat comprises a resistance 61 and a contact arm 62 slidably engaging the resistance 61. A connecting link 63 serves to connect the contact arms 57 and 62 so that any actuation of contact arm 57 imparts a corresponding movement to contact arm 62. The rheostat 60, as will be more apparent later, is used to vary the control point of the bonnet thermostat 45. By interconnecting the two rheostats, any adjustment of the control point of the room thermostat automatically effects a similar adjustment of the control point of the bonnet thermostat.

Rheostats 55 and 60 are used to adjust the control point of the room and the bonnet thermostat during the day time. Since it is desirable to automatically change the control point during certain periods, particularly during the night, a second set of rheostats 65 and 70 and a switching mechanism for interconnecting these in the system in lieu of rheostats 55 and 60 are provided. Rheostat 65 corresponds to rheostat 55, comprising a resistance 66 and a contact arm 67 slidably engaging the resistance 66. The contact arm 67 also cooperates with a scale 68 which has various temperatures indicated thereon. The rheostat 70 has a contact arm 71 slidably engaging a resistance 72. A link 73 interconnects the two contact arms 67 and 71 so that any movement imparted to contact arm 67 imparts a similar movement to contact arm 71. A time switch is generally designated by the reference numeral 75. This time switch comprises a synchronous motor having a rotor 76 and a field winding 78. The rotor 76 is connected through a gear train 79 with a cam shaft 80. Located on the cam shaft 80 is a plurality of cams 81 and 82. The cams 81 and 82 are provided with adjustable toe portions 83 and 84. The toe portions may be arranged so as to be varied in extent and location and, if desired, suitable calibrations may be provided to indicate the setting of the toe portions. Cooperating with the cams 81 and 82 are switch blades 85 and 86. The switch blade 85 is adapted to be engaged with contacts 87 and 88, respectively, and the switch blade 86 is adapted to be engaged with contacts 89 and 90. The cams are so arranged with respect to the switch arms that when the switch arms rest on the toe portions, they are in engagement with contacts 87 and 89, as indicated in the drawing. When the cams have rotated to a point where the switch arms 85 and 86 engage the heel portions of the cams, the switch arms are in engagement with contacts 88 and 90. The device is so operated that the switch arms are in engagement with contacts 87 and 89 during the day portion of the operation and with contacts 88 and 90 during the night portion of the operation. The field winding 78 of the synchronous motor employed in the time switch 75 is connected through conductors 92 and 93 with line wires 35 and 36. A manually operable switch 94 is connected in the conductor 92 for terminating the operation of the timer when desired.

Preferably located in proximity to the bonnet thermostat is a rheostat 95. This rheostat comprises a resistance 96 and a contact arm 97. This rheostat is used for the purposes of initially adjusting the relation between the settings of the room thermostat and the bonnet thermostat in accordance with the conditions existing in the particular building. The function of this rheostat will be more apparent from a subsequent description.

A balanced relay is generally designated by the reference numeral 100. This relay comprises a pair of series connected coils 101 and 102 which cooperate to position a core 103. The core 103 is operatively connected to a switch blade 104 which is adapted to be engaged with either of two contacts 105 and 106. When the coils 101 and 102 are equally energized, the core 103 is positioned so as to, in turn, position the switch blade 104 in its mid position, in which it is in engagement with neither of the two contacts 105 and 106. Upon relay coil 102 becoming more highly energized, the switch blade 104 is moved into engagement with contact 106. Upon relay coil 101 becoming more highly energized, the switch blade 104 is moved into engagement with contact 105.

A second balanced relay is designated by the reference numeral 110. This relay comprises two series connected coils 111 and 112 with which cooperates a movable core 113. The movable core 113 is connected to a switch blade 114 which is adapted to engage with either of two contacts 115 and 116. As in the case of balanced relay 100, an increase in the energization of the right-hand coil causes the switch blade 114 to move to the right into engagement with its contact 116, and upon the relay coil 111 being more highly energized than relay coil 112, the switch blade 114 is moved into engagement with contact 115.

Associated with and controlled by the balanced relay 100 is a relay 120. This relay comprises two oppositely wound relay coils 121 and 122. These relay coils are adapted to cooperate with two switch arms 123 and 124 which, in turn, are adapted to engage contacts 125 and 126, respectively. The switch arms 123 and 124 are normally biased out of engagement with their respective contacts. However, upon relay coil 121 alone being energized, the switch blades are moved into engagement with their contacts. As soon as both relay coils are energized, however, their effect is neutralized and the switch blades are moved to their deenergized positions.

A similar relay controlled by the other balanced relay 110 is designated by the reference numeral 130. This relay comprises oppositely wound relay coils 131 and 132 which control the position of switch arms 133 and 134. Switch arms 133 and 134 are adapted to be engaged with contacts 135 and 136. The switch arms are normally biased out of engagement with their contacts but upon energization of relay coil 131 alone, the switch arms are moved into engagement with their respective contacts. As in the preceding case, as soon as the other relay coil is energized, the effect of the two relay coils is neutralized so that the switch arms are moved to their biased positions.

A step-down transformer 140 is employed for supplying power for operation of the various control elements of the system. This transformer comprises a line voltage primary 141 connected to the line wires 35 and 36 and a low voltage secondary 142.

*Operation*

The balanced relays 100 and 110 through their associated relays 120 and 130 control in series the operation of the oil burner motor 26. The right-hand coil 102 of the balanced relay 100 is connected in series with the right-hand portion of the resistance of the room thermostat across the secondary of the transformer. The left-hand coil 103 is connected across the source of power in series with either rheostat 55 or 65, depending upon the position of the time switch. It will thus be seen that the balance in the energization of relay 100 is dependent upon both the room temperature and the setting of the rheostat 55 or 65, as the case may be. Thus, by changing the setting of the adjusting rheostat, the temperature at which the balanced relay becomes balanced is accordingly changed.

The relay coil 112 of the balanced relay coil 110 is connected in series with either the adjusting rheostat 60 or the adjusting rheostat 70, depending upon the position of the time switch. The left-hand coil 111 is connected in series across the source of power with rheostat 95, the bonnet thermostat 45, the outside thermostat 50, and the left-hand portion of the resistance of room thermostat 40. Thus, the balanced relay coil 110 is controlled on the one hand by the setting of rheostat 60 or 70, as the case may be, and on the other hand by the joint effect of the room temperature, the outside temperature, the bonnet temperature and the setting of the rheostat 95. As will be obvious from the more detailed explanation in the subsequent paragraphs, a decrease in either the room temperature or the outside temperature requires an increase in the bonnet temperature to rebalance the relay 110.

The various circuits will now be traced in more detail, preliminary to a detailed description of the operation of the system. The energizing circuit for the relay coil 102 of relay 100 is as follows: from the upper terminal of secondary 142 through conductors 145, 146, 147, 148, and 149, bimetal element 41, contact arm 42, the right-hand portion of resistance 43, conductor 150, relay coil 102, conductor 151, and conductors 152, 153, and 154 to the other terminal of secondary 142. Thus, as previously noted, the only control of the energization of relay coil 102 is the extent of the right-hand portion of resistance 43. The energizing circuit for relay coil 101, with the time switch in the position shown in the drawing, is as follows: from the upper terminal of secondary 142, through conductors 145, 146, 147, 148, and 156, contact arm 57, the right-hand portion of resistance 56, conductors 157 and 158, switch arm 86, contact 89, conductors 159 and 160, relay coil 101, and conductors 151, 152, 153, and 154 to the other terminal of secondary 142. Thus, it will be noted that the energization of relay coil 101 is controlled solely by the extent of the right-hand portion of resistance 56. It will be noted from the preceding description of the energizing circuits of relay coils 101 and 102 that an increase in the temperature of the room has as its effect a decrease in the amount of resistance in series with relay coil 102 and a consequent increase in the energization thereof so as to cause switch arm 104 to move into engagement with contact arm 106. If the room temperature decreases, on the other hand, the opposite action takes place so that the switch arm 104 is moved into engagement with contact 105. It will further be noted that the effect of moving contact arm 57 of the adjusting rheostat 55 to the right decreases the resistance in series with the right-hand coil 101 so that the relay 100 is not again rebalanced until the room temperature has increased causing the contact arm 42 to move to the right and reduce the extent of the right-hand portion of the resistance 43. Thus, the effect of moving the contact arm 57 to the right is to increase the temperature setting of thermostat 40, and similarly the effect of moving contact arm 57 to the left is to decrease the temperature setting of thermostat 40. As previously indicated, the scale 58 may be suitably calibrated to enable the operator to determine the temperature setting of the thermostat 40.

The energizing circuit for the relay coil 112 of relay 110 is as follows: from the upper terminal of secondary 142 through conductors 145, 146, 147, 143, 156, and 162, contact arm 62, the left-hand portion of resistance 61, conductors 164 and 165, switch arm 85, contact 87, conductors 166 and 167, relay coil 112, and conductors 168 and 154 to the other terminal of secondary 142. It is to be understood that this energizing circuit which has just been traced is that existing when the time switch is in its day position. The energizing circuit for the other relay coil 111 of the relay 110 is as follows: from the upper terminal of secondary 142, through conductors 145, 146, 147, 148, and 149, bimetallic element 41, contact arm 42, the left-hand portion of resistance 43, conductor 170, the upper portion of resistance 53, contact arm 52, bimetallic element 51, conductor 171, the left-hand portion of resistance 48, contact arm 47, conductor 172, the left-hand portion of resistance 96, contact arm 97, conductor 173, relay coil 111, and conductors 168 and 154 to the other terminal of secondary 142. It will be noted from the foregoing description that, as previously explained, during the day the energization of one of the coils of the relay 110 is determined by the extent of the setting of the adjusting rheostat 60 whereas the energization of the other relay coils is controlled by the positions of the room thermostat, the outdoor thermostat and the bonnet thermostat and by the setting of the rheostat 95. The room temperature, the outdoor temperature responsive, and the bonnet temperature responsive rheostats are so connected in the circuit that an increase in the temperature to which they are responsive results in an increase in the resistance in the circuit of the relay coil 111. Thus, for any given setting of the adjusting rheostat 60, the control point of the bonnet thermostat may be raised by either a decrease in the room temperature or by a decrease in the outside temperature since the effect of a decrease in either of these two last named temperatures is to decrease the resistance in the circuit and hence require an increase in the temperature of the bonnet to increase the value of that resistance sufficiently to again balance the value of the resistance 61. Moreover, since the resistance 61 controls the energization of the other relay coil 112, a movement of the contact arm 62 to the right increases the value of this resistance and hence increases the necessary aggregate value of the resistances connected in series with relay coil 111. Accordingly, in order for the relay to be rebalanced as a result of the shifting of the contact arm 62 to the right, it is necessary for certain of these resistances to increase in value. The value of the outside temperature responsive resistance 53 is obviously independent of any conditions within the building. Similarly, the value of the variable resistance 96 is normally unchanged, being initially fixed when the system is first installed. Accordingly, it is necessary for this change in resistance to be accomplished by either an increase in the bonnet temperature or room temperature or both. Because of the interlocked nature of the rheostats 55 and 60, the movement of the contact arm 62 to the right must have necessarily been accomplished by the movement of the arm 57 to the right to raise the control point of the room thermostat 40. Accordingly, part of this compensation for the increase in the value of the right-hand portion of resistance 61 is accomplished by the rise in room temperature. The rest is accomplished by a rise in bonnet temperature which obviously is necessary because of the demand for higher temperature in the space. Thus, a movement of contact arm 57 to the right with the resultant movement of contact arm 62 to the right causes an increase in the setting of the room temperature responsive thermostat 40, and at the same time an increase in the setting of the bonnet temperature responsive thermostat 45. It is to be understood that the various resistances are so chosen that the variation in the setting of the bonnet thermostat is just sufficient so that the increased bonnet temperature will assume a value just sufficient to keep the space temperature at the new desired value.

It will be apparent from the foregoing description that the adjustment of the rheostat 95 adjusts the setting of the bonnet temperature thermostat 45 for any particular setting of the space temperature thermostat 40. Each building has its own particular normal heat loss, this loss being determined by the extent and number of windows and nature of the walls, the exposure to wind and various other factors. In initially installing this system, the rheostat 95 is adjusted in accordance with this heat loss so that with all of the other adjustments fixed, the bonnet temperature thermostat will assume a setting which causes the bonnet temperature to be maintained and at a value just sufficient when the air is delivered to the space by operation of the fan 30 to keep the room temperature at the desired value. After this initial adjustment is made, the system is entirely automatic.

Let it be assumed that the various elements of the system are in the position shown in the drawing, which is the position assumed when the space and bonnet temperatures are approximately at but slightly above the desired values. If the space temperature now starts to decrease, the right-hand portion of resistance 43 is increased. This has as its effect, as previously explained, a decrease in the energization of relay coil 102 of relay 100. This causes switch arm 104 to be moved into engagement with contact 105. The moving into engagement of switch blade 104 with contact 105 results in the establishment of the following energizing circuit to relay coil 121: from the upper terminal of secondary 142, through conductors 145, 146, 147, 176, and 178, contact 105, switch blade 104, conductor 179, relay coil 121, and conductors 180, 152, 153, and 154, to the other terminal of secondary 142. The establishment of this energizing circuit to coil 121 results in switch arms 123 and 124 being moved into engagement with their respective contacts 125 and 126. The moving into engagement of switch blade 124 with contact 126 results in the establishment of the following holding circuit for relay coil 121: from the upper terminal of secondary 142, through conductors 145, 146, 147, 176, and 177, switch blade 124, contact 126, relay coil 180, and conductors 152, 153, and 154 to the other terminal of secondary 142. It will be noted that this circuit just traced is independent of the position of switch arm 104 so that relay coil 121 remains energized even after switch blade 104 moves out of engagement with contact 105. The moving into engagement of relay switch blade 123 with contact 125 does not have any immediate effect. This switch blade 123 and contact 125 is connected in series with switch blade 133 and contact 135. Consequently, until the last mentioned switch arm is in engagement with its contact, no circuit is established.

The various elements of the system are so adjusted that substantially at the same time the room temperature decreases below the value for which it is set, the bonnet temperature likewise decreases to a point where there is a call for heat by the bonnet thermostat. When this condition occurs, it will be as a result of contact arm 47 having moved to the left sufficiently so that the aggregate value of the various resistances in series with relay coil 111 of relay 110 is less than that in series with relay coil 112. As a consequence, relay coil 111 becomes more highly energized than relay coil 112, moving switch blade 114 into engagement with contact 115. As soon as this takes place, a circuit is established to relay coil 131 as follows: from the upper terminal of secondary 142, through conductors 145 and 181, contact 115, switch blade 114, conductor 182, relay coil 131, and conductors 183, 153, and 154 to the other terminal of secondary 142. The energization of relay coil 131 causes switch arms 133 and 134 to be moved into engagement with their contacts 135 and 136. The engagement of switch arm 134 with contact 136 results in the establishment of the following holding circuit to relay coil 131: from the upper terminal of secondary 142, through conductors 145, 146 and 185, switch arm 134, contact 136, relay coil 131, and conductors 183, 153, and 154 to the other terminal of secondary 142.

The moving into engagement of relay switch arm 133 with contact 135 results in the establishment of an energizing circuit to the oil burner motor 26 as follows: from the line wire 36, through conductor 34, switch 38, conductor 187, switch arm 123, contact 125, conductor 188, switch arm 133, contact 135, conductor 191, bimetal element 28, contact 29, conductor 189, burner motor 26, and conductor 190 to the other line wire 35.

The oil burner will now be in operation so that the bonnet temperature begins to rise. At the same time, due to the operation of the fan 30, the heated air is delivered to the space and the space temperature simultaneously begins to increase. Due to the novel interconnection in the present system of the various controls, the bonnet temperature will normally become satisfied at approximately the same time as the room temperature becomes satisfied. Due to a very slight time lag, however, in the delivery of the heated air to the space, it is possible for the bonnet temperature to become satisfied slightly before the room thermostat is satisfied. When this occurs, the resistance in series with relay coil 111 is increased to the point where it exceeds in value that in series with relay coil 112, so that relay coil 112 is the more highly energized one. When this takes place, contact arm 114 is moved into engagement with contact 116 and the following energizing circuit is established to the other relay coil 132 of relay 130: from the upper terminal of secondary 142, through conductors 145, 146 and 185, relay switch arm 134, contact 136, conductor 182, switch arm 114, contact 116, conductor 194, relay coil 132, and conductors 183, 153 and 154 to the other terminal of secondary 142. The simultaneous energization of relay coils 131 and 132 results in the switch arms 133 and 134 moving to their biased position. The moving of switch arm 134 out of engagement with contact 136 results in both the circuits to relay coils 131 and 132 being interrupted so as to terminate energization of the relay. The moving out of engagement of switch arm 133 with its contact results in an interruption to the oil burner circuit terminating the operation of the oil burner.

While the control point of the bonnet thermostat 45 is usually such that contact arm 47 never moves off of the resistance 48, the effect of the insulating section 49 is that if because of an abnormal heat demand, the bonnet temperature does rise excessively, the burner will be shut down. As previously indicated, the insulating section is located in a position corresponding to an undesired high temperature. Whenever the temperature reaches this value, the resistance in the circuit to coil 111 becomes almost infinitely high. This causes the energization of relay 110 to become unbalanced to cause the circuit to the oil burner to be broken, in a manner previously described.

The normal operation is that very shortly after the bonnet thermostat becomes satisfied, the effect of the heated air being conveyed to the rooms will cause the room thermostat 40 to become satisfied. This has as its effect a decrease in the extent of the right-hand portion of resistance 43 with the resultant increase in the energization of relay coil 102 relative to relay coil 101 until switch arm 104 is moved into engagement with contact 106. As soon as this takes place, the following energizing circuit is established to the other relay coil 122 of relay 120: from the upper terminal of secondary 142, through conductors 145, 146, 147, 176, and 177, switch blade 124, contact 126, conductor 179, switch blade 104, contact 106, conductor 196, relay coil 122, and conductors 180, 152, 153, and 154 to the other terminal of secondary 142. The result of the establishment of this energizing circuit is that both relay coils 121 and 122 are energized so that switch arms 123 and 124 will move out of engagement with their contacts to their biased position. The moving of contact arm 124 out of engagement with its contact 126 results in completely deenergizing the relay. The moving of contact arm 123 out of engagement with its contact has no effect because of the previous movement of switch arm 133 out of engagement with its contact 135. It is to be understood, however, that under certain circumstances, the room temperature may become satisfied slightly before the bonnet temperature in which case the switch arm 123 is separated from its contact before switch arm 133 is separated from its contact so that switch arm 123 is the one terminating the operation of the oil burner.

It will be noted that by reason of the outside temperature responsive resistance being connected in series with the bonnet temperature responsive resistance that a decrease in the outside temperature results in a corresponding increase in the bonnet temperature. These resistances will be so chosen that the increase in bonnet temperature will be just sufficient to take care of the increased heat loss as a result of the decrease in outside temperature. Similarly, by reason of the interconnection of the adjusting means for the bonnet and room thermostats, any change in the setting of the room thermostat automatically effects a change in the setting of the bonnet thermostat. Thus, again the bonnet temperature is varied to take care of a change in the heat demand. The above two adjustments for the bonnet temperature thermostat are ordinarily all that is sufficient. However, under certain circumstances, abnormal conditions may occur which will vary the heat loss for any given outside temperature. Thus, a window may be left open or certain of the rooms may be closed off. The result is that the relation between the desired bonnet temperature and the desired room temperature for any given outside temperature is changed. While this, of course, could be taken care of by an adjustment of the rheostat 95, it would be obviously undesirable to require an operator to adjust this rheostat under such conditions. Moreover, in the majority of cases the occupant of the dwelling would not have the technical knowledge or equipment necessary to make a proper adjustment. The connection, however, of the left-hand portion of resistance 43 in series with the bonnet temperature responsive resistance automatically takes care of this. If when the bonnet temperature becomes satisfied, the room temperature still is not satisfied but continues to drop, then the moving of the arm 42 to the left as a result of such drop in room temperature causes a decrease in the resistance in series with the bonnet temperature switch. This automatically again unbalances the relay 110 so as to cause this relay to reenergize relay 130. Moreover, until such time as the bonnet temperature has been increased to a slightly higher value than the previous setting of the bonnet thermostat, the burner will continue in operation. A corresponding lowering of the setting of the bonnet temperature switch will occur whenever the room temperature increases unduly as a result of the heat loss being abnormally low for some reason. The value of resistance 43 can be sufficiently high with respect to the bonnet temperature responsive resistance 45 that a very slight change in the position of the contact arm 42 on resistance 43 can make a substantial change in the setting of the bonnet thermostat. As a result, the setting of the bonnet thermostat is readjusted whenever the room thermostat deviates an abnormal amount from its desired value. Thus, it will be seen that the present system provides for adjustment of the setting of the bonnet thermostat in response to not only the outside temperature and the adjustment of the room thermostat but also in response to the room temperature itself. In this manner, it is assured that the bonnet temperature will be always maintained at substantially the value necessary to keep the space temperature at the desired value.

If it is desired to eliminate the adjustment of the bonnet temperature in accordance with space temperature, all that is necessary is that conductor 170 be connected to conductor 162 instead of the left-hand terminal of resistance 43. When this is done, the value of the left-hand portion of resistance 43 has no effect.

The operation which has been described is that which occurs when the time switch is in its day position as shown in the drawing. Let it be assumed now that the motor 76 rotates the cam shaft 80 sufficiently to cause the switch blades 85 and 86 to move into their night position wherein they are in engagement with contacts 88 and 90. The energizing circuit of relay coil 101 is now as follows: from secondary 142, through conductors 145, 146, and 198, contact 90, switch blade 86, conductor 158, the right-hand portion of resistance 66, switch arm 67, conductor 160, relay coil 101, and conductors 151, 152, 153, and 154 to the other terminal of secondary 142. It will thus be seen that the rheostat 65 is now connected in series with relay coil 101. The resistance 56 of the rheostat 55 is moreover shorted out through the following circuit: from the right-hand terminal of resistance 56 through conductors 157 and 158, switch blade 86, contact 90, conductors 198, 147, 148, and 156, and contact arm 57. When the switch arm 86 was in engagement with contact 89 in its day position, the resistance 66 was similarly shorted out through a circuit as follows: from the right-hand terminal of resistance 66, through conductor 158, switch blade 86, contact 89, conductor 159, and contact arm 67.

The energizing circuit of relay coil 112 of relay 110, with the time switch in its night position, is as follows: from the upper terminal of secondary 142, through conductors 145, 146, and 198, contact 88, switch blade 85, conductor 165, resistance 72, switch arm 71, conductor 167, relay coil 112, and conductors 168 and 154 to the other terminal of secondary 142. The resistance 61 is, moreover, shorted out through the following circuit from the left-hand terminal of resistance 61, through conductors 164 and 165, switch blade 85, contact 88, conductors 198, 147, 148, 156, and 162, and contact arm 62. When the switch blade 85 was in its day position, the resistance 72 was shorted out through the circuit as follows: from the left-hand terminal of resistance 72, through conductor 165, switch blade 85, contact 87, conductor 166, and contact arm 71.

It will thus be seen that the function of the time switch is to substitute rheostats 65 and 70 for rheostats 55 and 60 during the night time and during the day time to place rheostats 55 and 60 in control. Moreover, the pair of resistances not in control is shorted out so that they have no effect. It will further be noted that at no time are the circuits to the balanced relays 100 and 110 actually open.

The rheostats 65 and 70 are normally maintained set at a lower temperature value which it is desired to maintain during the night period. Accordingly, with the resistance of these rheostats in series with relay coils 101 and 112, respectively, it is necessary for the bonnet and room temperatures to decrease before the relay is balanced. This results in both a lower bonnet temperature and a lower room temperature.

It will be readily seen that in the present system, the bonnet temperature is always maintained at the proper value to maintain the desired room temperature. This results in a much more uniform operation of the heating system and insures that at all times there will be a flow of warm air to the rooms. By reason of the fact that the bonnet temperature is always heated at the proper temperature, it is possible to have a continuously operating fan.

It will be noted, moreover, that this is accomplished by the use of an extremely effective and simple control circuit. By placing each of the adjusting resistances in series with a relay coil of a balanced relay, it is possible to interconnect the two systems by an interconnection of the adjusting resistances so that a definite relation may always be maintained between two controlled conditions. Furthermore, by reason of the fact that each relay coil is connected across the same source of power, the system is free of the effect of voltage variations.

While the temperature control system has been shown as embodied in a warm air heating system, it is to be understood that the invention is not so limited. As pointed out in the earlier part of the specification, the present invention is applicable to any system wherein some fluid medium is heated and it is used to transfer the heat from the heater to the space being heated. Thus, the fluid heated may be water of a hot water system, or the steam of a steam heating system. Moreover, the invention is not even limited to the heating art but in its broader aspects is applicable to any condition control system. In general, while I have disclosed a certain specific embodiment of my invention for purposes of illustration, it is to be understood that the invention is limited only by the scope of the appended claims.

I claim as my invention:

1. In a system for controlling the temperature of a space, heating means comprising a heater for heating a fluid medium and means for bringing said fluid into heat transferring relation with said space, means responsible to the temperature of the fluid operative to control said heating means, means responsive to the temperature of the space also operative to control said heating means, a separate means for adjusting the temperature control point of each of said temperature responsive means, and an operative connection between said adjusting means effective upon either adjusting means being actuated to cause a proportional actuation of the other adjusting means whereby a predetermined relation between the temperature control points of said two temperature responsive means is maintained.

2. In a system for controlling the temperature of a space, heating means comprising a heater for heating a fluid medium and means for bringing said fluid into heat transferring relation with said space, means responsive to the temperature of the fluid operative to control said heating means, means responsive to the temperature of the space also operative to control said heating means, a separate means for adjusting the temperature control point of each of said temperature responsive means, an operative connection between said adjusting means effective upon either adjusting means being actuated to cause a proportional actuation of the other adjusting means whereby a predetermined relation between the temperature control points of said two temperature responsive means is maintained, and means for varying said relation between the temperature control points of said temperature responsive means.

3. In a system for controlling the temperature of a space, heating means comprising a heater for heating a fluid medium and means for bringing said fluid into heat transferring relation with said space, means responsive to the temperature of the fluid operative to control said heating means, means responsive to the temperature of the space also operative to control said heating means, a pair of adjusting means, each operable upon actuation thereof to simultaneously adjust the temperature control points of both of said temperature responsive means, and means including a timing device operable to transfer the control of said two temperature responsive means from one of said adjusting means to the other adjusting means during certain predetermined periods.

4. In combination, condition changing means, a condition responsive variable resistance located in a medium whose condition is to be controlled, a balanced relay having first and second opposed windings, means controlled by said windings for decreasing the condition changing effect of said condition changing means when said first winding is more highly energized than the second and for increasing the condition changing effect of said condition changing means when said second winding is more highly energized than the first, a source of power, means connecting one of said windings across said source of power in series with said condition responsive variable resistance, and a manually variable resistance connected in series with said other winding across said source of power, said manually variable resistance serving to vary the value of the condition responsive variable resistance at which said relay is balanced and accordingly to vary the value of the condition of the medium maintained.

5. In a condition control system for simultaneously controlling two conditions so as to maintain a definite relation between said conditions; condition changing means operative to change the values of both conditions; means for controlling each condition; each of said means comprising a resistance variable in accordance with the value of the condition to be controlled, a balanced relay having first and second opposed windings, means controlled by said windings tending to decrease the condition changing effect of said condition changing means when said first winding is more highly energized than the second and tending to increase the condition changing effect of said condition changing means when said second winding is more highly energized than the first, means connecting one of said windings across said source of power in series with the variable resistance responsive to the respective condition, and an adjustable resistance connected in series with said other winding across said source of power to vary the value of the respective condition maintained; and connecting means between said resistances so that any adjustment of one resistance to vary the value of the associated condition causes an adjustment of the other resistance sufficient to correspondingly vary the value of the other condition.

6. In a system for controlling the temperature of a space, temperature changing means for changing the temperature of a fluid medium and for bringing said fluid into heat transferring relation with said space, means responsive to the temperature of the fluid operative to position a first switch, means responsive to the temperature of the space operative to position a second switch, means controlled by said first and second switches for controlling said temperature changing means, and means for simultaneously adjusting the control points of both of said temperature responsive means.

7. In a system for controlling the temperature of a space, temperature changing means for changing the temperature of a fluid medium and for bringing said fluid into heat transferring relation with said space, means responsive to the temperature of the fluid operative to position a first switch, means responsive to the temperature of the space operative to position a second switch, means controlled by said first and second switches for controlling said temperature changing means, means for simultaneously adjusting the control points of both of said temperature responsive means, and means for adjusting the control point of one of said temperature responsive means independently of that of the other.

8. In a system for controlling the temperature of a space, temperature changing means for changing the temperature of a fluid medium and for bringing said fluid into heat transferring relation with said space, means controlled by a pair of independent control devices for controlling said temperature changing means, means for controlling one of said control devices in accordance with both the temperature of the fluid and the temperature of the space, means for controlling the other control device in accordance with the space temperature alone, and manually operable means for simultaneously adjusting the control points of both of said control devices.

9. In a system for controlling the temperature of a space, temperature changing means for changing the temperature of a fluid medium and for bringing said fluid into heat transferring relation with said space, electrically operated means controlled by a pair of independent series connected switches for controlling said temperature changing means, means for controlling one of said switches in accordance with both the temperature of the fluid and the temperature of the space, and means for controlling the other switch in accordance with the space temperature alone.

10. In a system for controlling the temperature of a space, temperature changing means for changing the temperature of a fluid medium and for bringing said fluid into heat transferring relation with said space, electrically operated means controlled by a pair of independent series connected switches for controlling said temperature changing means, means for controlling one of said switches in accordance with the temperature of the fluid, the temperature outside of the space, and the temperature of the space, and means for controlling the other switch in accordance with the space temperature alone.

11. In a condition controlling system, condition changing means, means including a plurality of condition responsive means controlling said condition changing means, each of said condition responsive means being responsive to a different controlling condition, a pair of manually operable adjusting means, each operable upon actuation thereof to simultaneously adjust the condition control points of said plurality of condition responsive means, and means including a timing device operable to transfer the control of said plurality of temperature responsive means from one of said adjusting means to the other adjusting means during certain predetermined periods to thereby vary the value of the condition maintained.

CLARENCE W. NESSELL.